United States Patent
Inamori et al.

(10) Patent No.: US 9,651,451 B2
(45) Date of Patent: May 16, 2017

(54) BACKLASH MEASUREMENT DEVICE AND BACKLASH MEASUREMENT METHOD

(71) Applicant: HONDA MOTOR CO., LTD., Tokyo (JP)

(72) Inventors: Kazunari Inamori, Tokyo (JP); Hideo Suzuki, Tokyo (JP); Susumu Tanaka, Tokyo (JP); Seiichiro Naka, Tokyo (JP); Yuji Sezaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 76 days.

(21) Appl. No.: 14/440,067

(22) PCT Filed: Oct. 22, 2013

(86) PCT No.: PCT/JP2013/078578
§ 371 (c)(1),
(2) Date: Apr. 30, 2015

(87) PCT Pub. No.: WO2014/073367
PCT Pub. Date: May 15, 2014

(65) Prior Publication Data
US 2015/0260608 A1  Sep. 17, 2015

(30) Foreign Application Priority Data
Nov. 9, 2012 (JP) ................................ 2012-247360

(51) Int. Cl.
*G01M 15/00* (2006.01)
*G01M 13/02* (2006.01)
(Continued)

(52) U.S. Cl.
CPC .......... *G01M 13/023* (2013.01); *F16H 57/12* (2013.01); *G01B 5/14* (2013.01); *G01B 5/146* (2013.01);
(Continued)

(58) Field of Classification Search
CPC .... G01M 13/02; G01M 13/023; G01M 13/04; G01B 5/14; G01B 5/146; F16H 25/2209;
(Continued)

(56) References Cited

U.S. PATENT DOCUMENTS 6,079,278 A * 6/2000 Ishida .................... G01B 5/146
73/117.02

FOREIGN PATENT DOCUMENTS

JP   H06-056708   8/1994
JP   08-101003    4/1996
(Continued)

OTHER PUBLICATIONS

International Search Report, Date of mailing: Dec. 3, 2013 (Dec. 3, 2013).

*Primary Examiner* — Benjamin Schmitt
(74) *Attorney, Agent, or Firm* — Rankin, Hill & Clark LLP

(57) ABSTRACT

This backlash measurement device measures the backlash existing between a first part and a second part that is provided with: a left pressing piece (37L) and a right pressing piece (37R) that rotate together with the second part, that pass through the center of rotation (41), and that extend the same distance from the center of rotation; a left pressing mechanism (38L) that presses the left pressing piece and a right pressing mechanism (38R) that presses the right pressing piece; a displacement amount detection mechanism (39) that comes into contact with the right pressing piece and that measures the displacement amount of the left pressing piece and the displacement amount of the right pressing piece; and a calculation unit (49) that determines backlash on the basis of the left displacement amount and the right displacement amount detected by the displacement amount detection mechanism.

11 Claims, 14 Drawing Sheets

(51) Int. Cl.
  *G01M 13/04* (2006.01)
  *G01B 5/14* (2006.01)
  *F16H 57/12* (2006.01)
  *F16H 25/22* (2006.01)
(52) U.S. Cl.
  CPC ......... *G01M 13/04* (2013.01); *F16H 25/2209* (2013.01)
(58) Field of Classification Search
  CPC ............... F16H 57/12; F16H 2057/123; F16H 2057/125
  USPC .................................. 73/114.26, 114.81, 812
  See application file for complete search history.

(56) References Cited

FOREIGN PATENT DOCUMENTS

| | | |
|---|---|---|
| JP | 11-142101 | 5/1999 |
| JP | 2001-116091 | 4/2001 |
| JP | 2012-083256 | 4/2012 |

\* cited by examiner

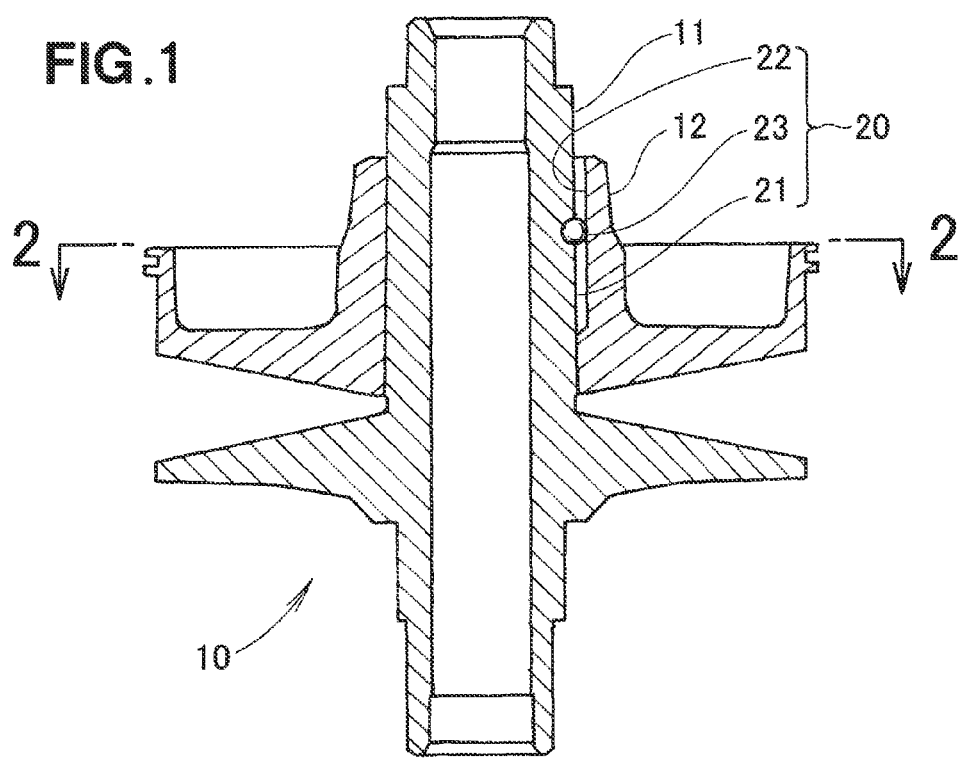
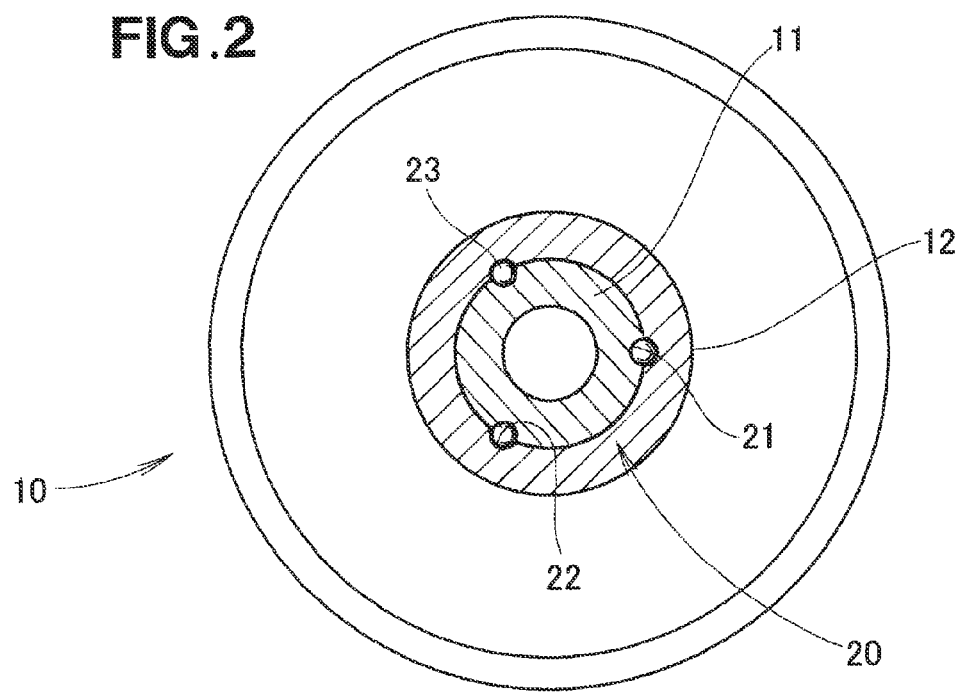

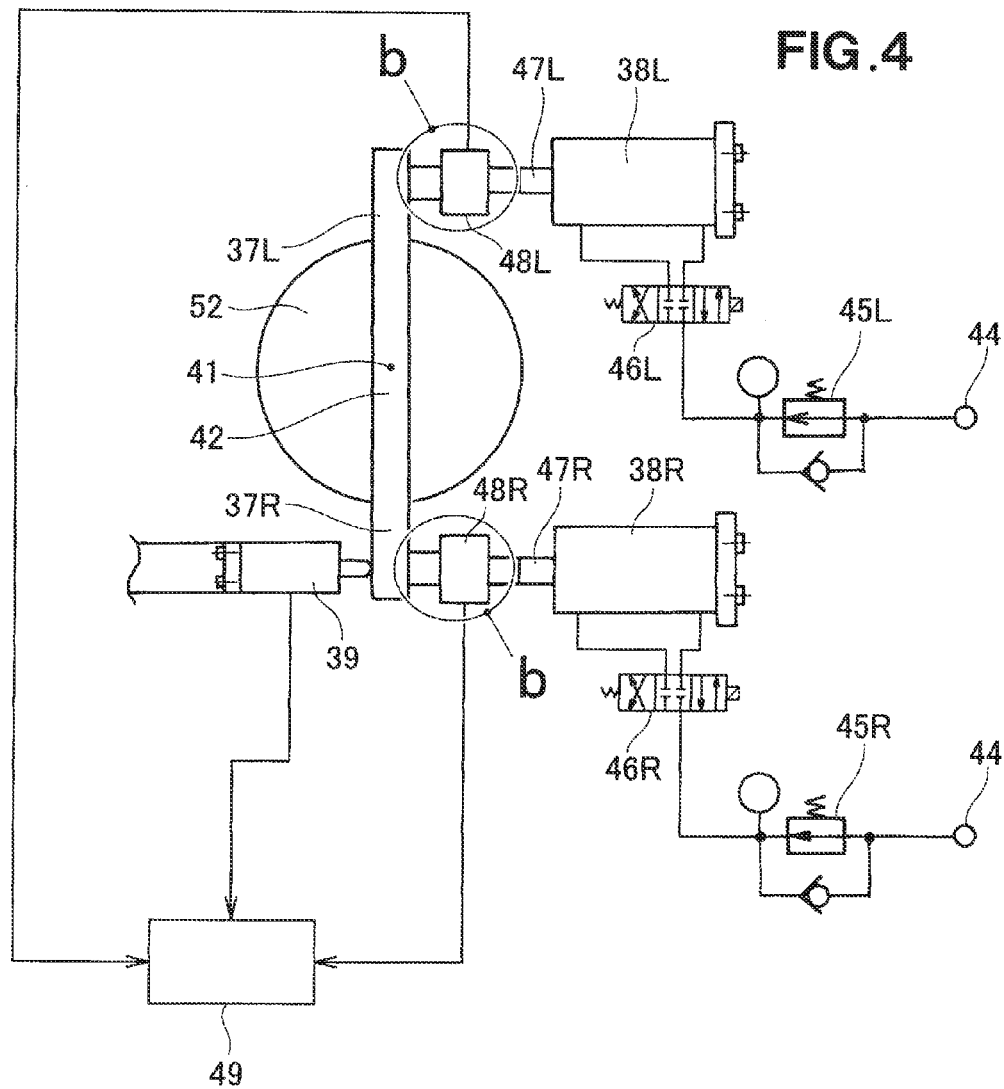
FIG.4
(a)
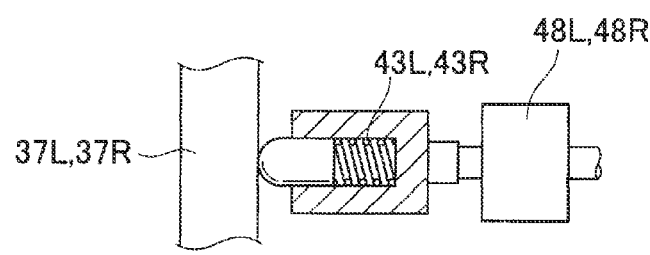
(b)

FIG.5
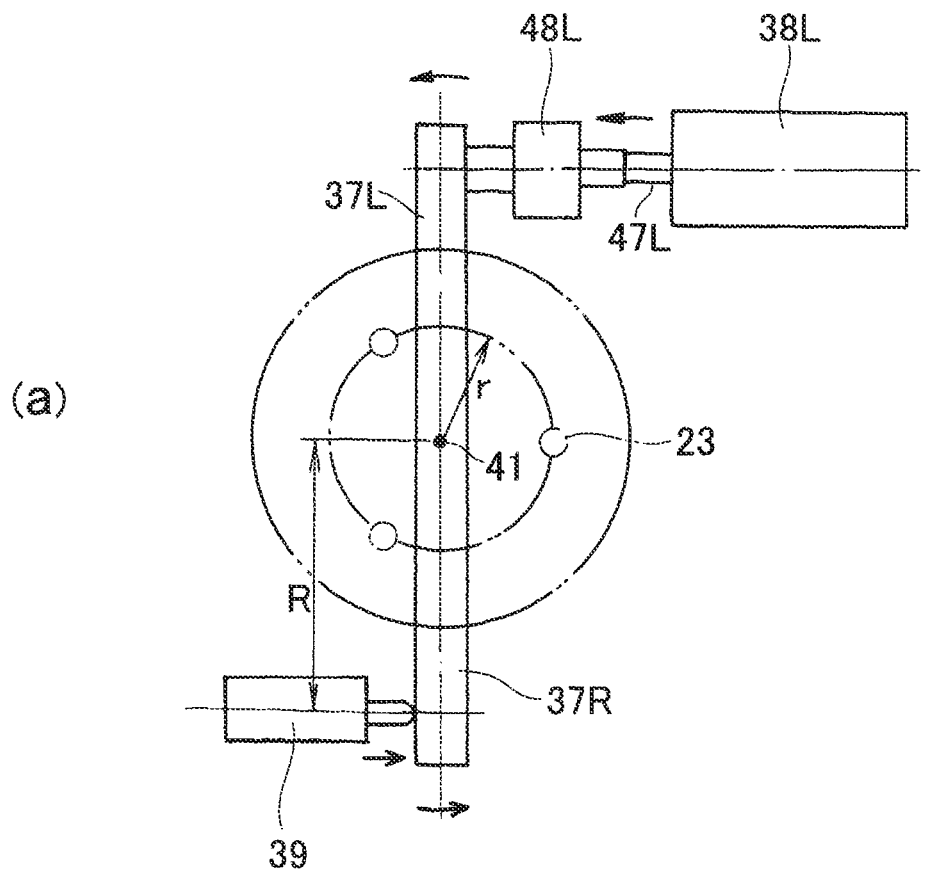
(a)
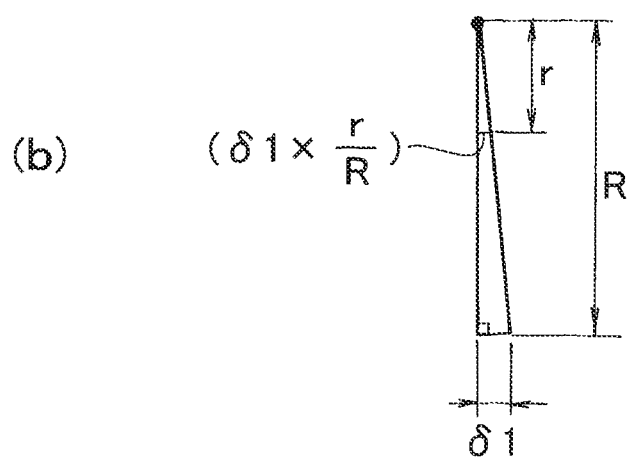
(b) $(\delta 1 \times \frac{r}{R})$

FIG.6
(a)
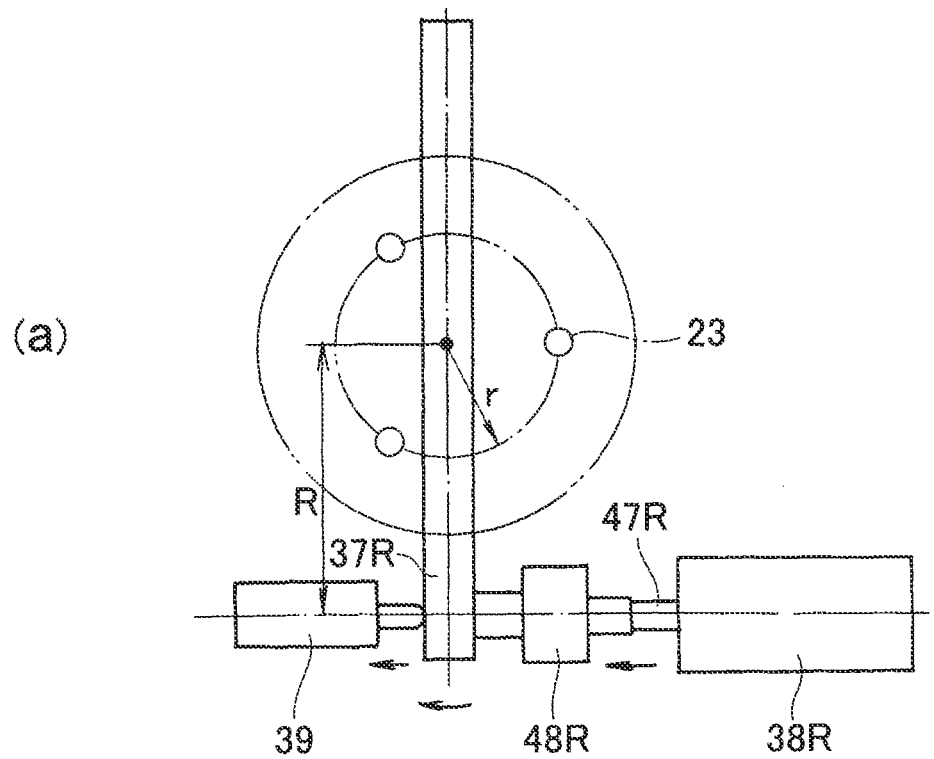
(b)
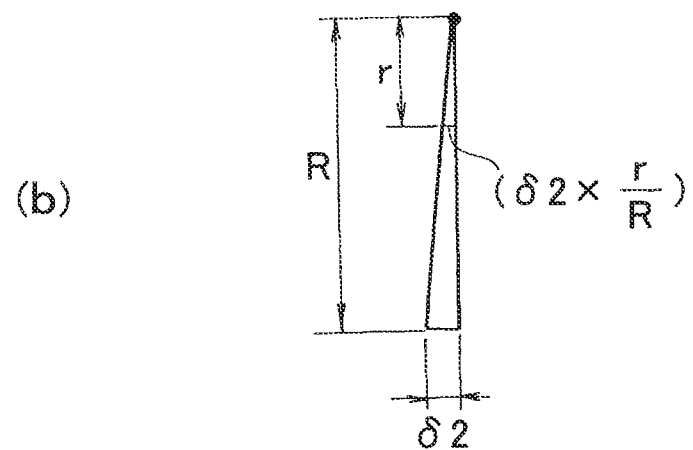

BACKLASH MEASUREMENT DEVICE AND BACKLASH MEASUREMENT METHOD

TECHNICAL FIELD

The present invention relates to a device and a method for measuring a backlash present between two rotating components engaging with each other.

BACKGROUND ART

Among elements that support a rotating body, there is a bearing. Among elements that support a linear motion body, there are a feather key, a straight-sided spline, and a ball spline.

Among them, the ball spline is an element in which balls (or needles) are placed between a spline shaft and a sleeve. The ball spline can move the sleeve along the spline shaft regardless of the length of moving distance. The balls are placed between the sleeve and the spline shaft, so that it is possible to reduce the frictional resistance.

Smooth motions are ensured by providing a small gap between the balls and the spline shaft. In the same manner, smooth motions are ensured by providing a small gap between the balls and the sleeve. This is because if there is no gap, the balls do not rotate smoothly. The gap appears as a backlash. The backlash is defined as the maximum gap occurring when the rotation is changed from normal to reverse. When the backlash is large, a shock generated when the rotation is reversed is large.

Therefore, the backlash needs to be set to an appropriate value or an appropriate range.

As a prerequisite of the setting, the backlash needs to be measured, so that various measurement techniques have been proposed (for example, see Patent Literature 1).

The technique disclosed in Patent Literature 1 will be described with reference to FIGS. 18 to 19 hereof.

FIG. 18 is a cross-sectional view of a major part of the disclosed belt-type continuously variable transmission. The belt-type continuously variable transmission 100 abbreviated as CVT includes a fixed sheave 101, a movable sheave 103 that is movably fitted into a shaft 102 of the fixed sheave 101, an actuator 104 that moves the movable sheave 103, and a belt 105 provided so as to be sandwiched by the fixed sheave 101 and the movable sheave 103.

When the movable sheave 103 is pushed out to the fixed sheave 101 by the actuator 104, a rotation diameter of the belt 105 increases. On the other hand, when the movable sheave 103 is pulled away from the fixed sheave 101, the rotation diameter of the belt 105 decreases. The speed is varied by changing the rotation diameter.

A ball spline mechanism is arranged between the shaft 102 of the fixed sheave 101 and the movable sheave 103. The ball spline mechanism includes an inner spline groove 107 provided in the shaft 102, an outer spline groove 109 provided in a sleeve 108, and a ball 111 fitted between the grooves 107 and 109. The backlash is measured for such a ball spline mechanism.

FIG. 19 is a diagram for explaining a basic principle of a conventional backlash measurement. A reference ball 113 having a diameter smaller than that of a normal ball 111 is prepared and the reference ball 113 is placed between the inner spline groove 107 and the outer spline groove 109.

Subsequently, when the sleeve 108 is moved with respect to the shaft 102 in the axis direction of the shaft 102, the moving distance is (A0/2). The outer diameter d0 of the reference ball 113 is already known. The outer diameter d of the ball 111 at that time (to be precise, the diameter of an inscribed circle of the inner spline groove 107 and the outer spline groove 109) is geometrically calculated from the moving distance (A0/2) and the outer diameter d0.

A ball 111 whose diameter is close to the obtained outer diameter is selected and the selected ball 111 is fitted into the inner spline groove 107 and the outer spline groove 109.

In other words, the technique of Patent Literature 1 is a technique for determining an optimal outer diameter of the ball 111. Basically, the moving distance is measured by using the reference ball 113 whose diameter is small in order to increase the moving distance (A0/2).

First, a large number of balls 111 whose diameters are different from each other need to be prepared, so that it is troublesome to store and sort the larger number of balls 111. A wrong combination occurs at a certain probability.

Further, the reference ball 113 is put in and the measurement is performed, and then the reference ball 113 is removed, and thereafter the selected ball 111 is put in, so that the number of processes increases and the production efficiency decreases.

Therefore, a technique is required which can quickly measure the backlash without using the reference ball.

PRIOR ART LITERATURE

Patent Literature

Patent Literature 1: JP H11-142101 A

SUMMARY OF INVENTION

Technical Problem

An object of the present invention is to provide a technique which can quickly measure a backlash without using a reference ball.

Solution to Problem

According to one aspect of the present invention, there is provided a backlash measurement device for measuring a backlash present between a first part included in a workpiece and a second part engaging with the first part and which includes: a device frame fixed to a base; a part fixing mechanism which is attached to the device frame and which fixes the first part; a part support mechanism which is rotatably attached to the device frame and which supports the second part; a left pressing piece and a right pressing piece which are attached to the part support mechanism and which extend the same distance from a rotation center so as to pass through the rotation center; a left pressing mechanism that presses the left pressing piece and a right pressing mechanism that presses the right pressing piece; a displacement amount detection mechanism which comes into contact with the right pressing piece and measures an amount of displacement of the left pressing piece and an amount of displacement of the right pressing piece; and a calculation unit that obtains the backlash based on the left displacement amount and the right displacement amount which are detected by the displacement amount detection mechanism.

It is preferable that the second part be a shaft member including an inner spline groove, the first part be a sleeve including an outer spline corresponding to the inner spline groove and a ball that fits into the outer spline groove and the ball be placed between the outer spline groove and the inner spline groove so as to measure a backlash caused by the ball.

Preferably, the part support mechanism includes a shaft member gripping mechanism that grips the shaft member, a cup member which supports the shaft member gripping mechanism and surrounds a shaft end of the shaft member, and a holding mechanism which is placed between the cup member and the device frame and which rotatably holds the cup member.

It is preferable that the part support mechanism include a shaft member gripping mechanism that grips the shaft member and a holding mechanism which is placed between the shaft member gripping mechanism and the device frame and which rotatably holds the shaft member gripping mechanism, while the shaft member gripping mechanism includes a rotating plate which has a hole, through which the shaft member passes, and rotates along with the shaft member, a lock arm that is extended so as to be in contact with the hole, a support pin that pins a tip of the lock arm to the rotating plate, a bent link that is extended from a base portion of the lock arm, a lock pin that pins a tip of the bent link to the rotating plate, and a lock cylinder in which a piston rod extends along the lock arm and is pinned to the rotating plate and a tip of the piston rod is connected to a bent point of the bent link.

Preferably, the shaft member is vertically arranged.

It is preferable that the holding mechanism include a lower doughnut plate having a flat upper surface, a plurality of balls mounted on the upper surface of the lower doughnut plate, a retainer that retains the balls to keep pitches and trajectories of the balls, and an upper doughnut plate which is mounted on the balls and which has a flat lower surface.

Preferably, the shaft member is a fixed sheave of a belt-type continuously variable transmission while the sleeve is a movable sheave of the belt-type continuously variable transmission.

It is preferable that the first part be a first gear, and the second part be a second gear engaging with the first gear.

Preferably, each of the left pressing mechanism and the right pressing mechanism includes a cylinder unit and a load cell attached to a tip of a piston rod of the cylinder unit.

It is preferable that the cylinder unit be an electric cylinder unit.

According to another aspect of the present invention, there is provided a backlash measurement method which is performed by using the backlash measurement device of claim 9, the method comprising the steps of: converting a torque value required for the workpiece into a load of the load cell prior to a measurement and determining a left predetermined load and a right predetermined load; detecting a left displacement amount by the displacement amount detection mechanism; causing the calculation unit to store the left displacement amount as a left effective displacement amount after a load detected by the left load cell reaches the left predetermined load; detecting a right displacement amount by the displacement amount detection mechanism; causing the calculation unit to store the right displacement amount as a right effective displacement amount after a load detected by the right load cell reaches the right predetermined load; and causing the calculation unit to calculate a backlash based on the left effective displacement amount and the right effective displacement amount.

Advantageous Effects of Invention

The backlash measuring device according to the present invention includes left and right pressing pieces which are attached to the part support mechanism and which extend the same distance from a rotation center so as to pass through the rotation center, a left pressing mechanism that presses the left pressing piece and a right pressing mechanism that presses the right pressing piece, a displacement amount detection mechanism which comes into contact with the right pressing piece and measures an amount of displacement of the left pressing piece and an amount of displacement of the right pressing piece, and a calculation unit that obtains the backlash based on the left displacement amount and the right displacement amount which are detected by the displacement amount detection mechanism.

Thus, a technique is provided which can measure a backlash for all the workpieces without using a reference ball.

In the invention, it is possible to measure a backlash of a workpiece including a ball spline mechanism.

In the invention, the part support mechanism includes a shaft member gripping mechanism that grips the shaft member, a cup member which supports the shaft member gripping mechanism and surrounds a shaft end of the shaft member, and a holding mechanism which is placed between the cup member and the device frame and which rotatably holds the cup member. The shaft end of the shaft member is surrounded by the cup member, so that it is possible to arrange the left pressing piece and the right pressing piece close to the shaft end. Thus, it becomes possible to reduce the size of the backlash measurement device.

In the invention, the part support mechanism includes a shaft member gripping mechanism and a holding mechanism and the shaft member gripping mechanism includes a rotating plate, a lock arm, a support pin that pins a tip of the lock arm to the rotating plate, a bent link that is extended from a base portion of the lock arm, a lock pin that pins a tip of the bent link to the rotating plate, and a lock cylinder in which a piston rod extends along the lock arm and is pinned to the rotating plate and a tip of the piston rod is connected to a bent point of the bent link.

The shaft member is fixed by one lock arm. There is one lock arm, so that the shaft member gripping mechanism has a simple structure.

In the invention, the shaft member is vertically arranged with respect to the ground. It is possible to arrange the left pressing mechanism and the right pressing mechanism symmetrically with respect to the vertical shaft.

In the invention, the holding mechanism includes a lower doughnut plate having a flat upper surface, a plurality of balls mounted on the lower doughnut plate, and an upper doughnut plate which is mounted on the balls and which has a flat lower surface. The doughnut plates are flat, so that the shaft member is allowed to move in the direction perpendicular to the shaft.

According to the invention, it is possible to apply the present invention to a belt-type continuously variable transmission. It is possible to inspect a backlash of all belt-type continuously variable transmissions, so that it is possible to further improve the reliability of the belt-type continuously variable transmissions. Further, it is possible to perform inspection in a production line (in-line inspection), so that the manufacturing process can be reduced.

In accordance with the invention, a backlash measurement device is provided which can measure a backlash present between the first gear and the second gear, that is, a backlash of the gears.

In the invention, a cylinder unit is employed as the pressing mechanism and a load cell is attached to the tip of the piston rod of the cylinder unit, so that it is possible to accurately measure the torque.

In the invention, the cylinder unit is an electric cylinder unit. An oil hydraulic cylinder and an air cylinder can be used as the cylinder unit. However, an electric cylinder unit is preferred from a viewpoint of cost and positional accuracy.

According to the invention, the amount of displacement can be converted into the effective displacement amount by the load cell and the backlash can be calculated based on the effective displacement amount. It is possible to accurately measure the torque of the cylinder unit and quickly perform the calculation as compared with a case in which no load cell is used. Therefore, according to the present invention, a technique is provided which can quickly measure the backlash without using the reference ball.

BRIEF DESCRIPTION OF DRAWINGS

FIG. 1 is a cross-sectional view of a typical workpiece;

FIG. 2 is a cross-sectional view taken along line 2-2 of FIG. 1;

FIG. 4(a) is a view as seen in the direction of arrow 4 of FIGS. 3, 9, and 17, while FIG. 4(b) is an enlarged view of portion b of FIG. 4(a);

FIGS. 5(a) and (b) are action diagrams of a left pressing mechanism;

FIGS. 6(a) and (b) are action diagrams of a right pressing mechanism;

DESCRIPTION OF EMBODIMENT

Figure 3:
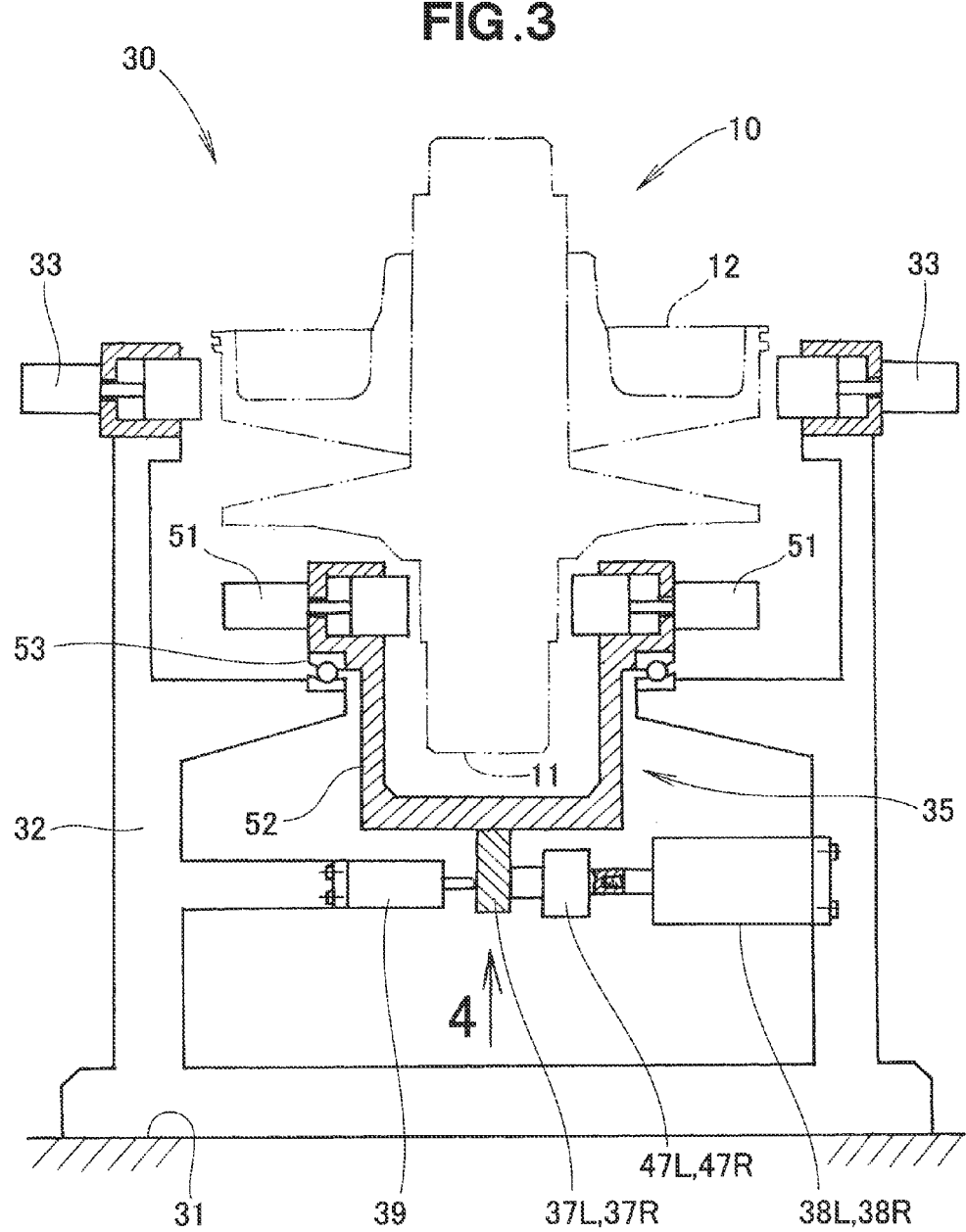
FIG. 3 is a front view of a backlash measurement device according to the present invention.

A preferred embodiment of the present invention will be described with reference to the accompanying drawings.
Embodiment As illustrated in FIG. 1, a workpiece 10 includes a sleeve 12 as a first part and a shaft member 11 as a second part that engages with the sleeve 12. The sleeve 12 is fitted to a shaft member 11 through a ball spline mechanism 20.

The shaft member 11 is preferably a fixed pulley which is one of main elements of a belt-type continuously variable transmission.

The sleeve 12 is preferably a movable pulley which is another one of main elements of the belt-type continuously variable transmission.

As illustrated in FIG. 2, the ball spline mechanism 20 includes inner spline grooves 21 provided in the shaft member 11, outer spline grooves 22 provided in the sleeve 12, and balls (or rollers or needles) 23 provided between these grooves 21 and 22.

The sleeve 12 can move in the front and back direction of FIG. 2 with respect to the shaft member 11. A rotational force is transmitted from the shaft member 11 to the sleeve 12 through the balls 23. Alternatively, a rotational force is transmitted from the sleeve 12 to the shaft member 11.

There is a backlash between the shaft member 11, the ball 23, and the sleeve 12. A preferred example of a device that measures the backlash will be described below.

As illustrated in FIG. 3, a backlash device 30 includes a device frame 32 that is fixed to a base 31, a part fixing mechanism 33 which is attached to the device frame 32 and fixes the sleeve 12 as the first part, a part support mechanism 35 which is rotatably attached to the device frame 32 and supports the shaft member 11 as the second part, a left pressing piece 37L (L is a suffix indicating left and the same applies hereinafter) which is attached to the part support mechanism 35 and extends the same distance from the rotation center so as to pass through the rotation center, a left pressing mechanism 38L which is provided to the device frame 32 and presses the left pressing piece 37L, a right pressing piece 37R (R is a suffix indicating right and the same applies hereinafter), a right pressing mechanism 38R which is provided to the device frame 32 and presses the right pressing piece 37R, and a displacement amount detection mechanism 39 which is provided to the device frame 32 and detects an amount of displacement of the left pressing piece 37L and the right pressing piece 37R.

As illustrated in FIG. 4(a), the left pressing piece 37L (L and R are reversed because FIG. 4(a) is a bottom view) radially extends from a shaft center 41, which is the rotation center, to one direction. The right pressing piece 37R radially extends from the shaft center 41 to the other direction. In the present embodiment, one side of one bar 42 is defined as the left pressing piece 37L and the other side is defined as the right pressing piece 37R. Although the left pressing piece 37L and the right pressing piece 37R can be provided independently from each other, the present embodiment is more inexpensive than that.

An example will be described in which the left pressing mechanism 38L and the right pressing mechanism 38R are oil hydraulic cylinders or air cylinders.

High-pressure fluid sent from a hydraulic power source or a pneumatic power source 44 is depressurized to a desired pressure by a left pressure-reducing valve 45L and is sent to the left pressing mechanism 38L through a left direction switching valve 46L. A piston rod 47L advances or retreats.

In the same manner, high-pressure fluid sent from the hydraulic power source or the pneumatic power source 44 is depressurized to a desired pressure by a right pressure-reducing valve 45R and is sent to the right pressing mechanism 38R through a right direction switching valve 46R. A piston rod 47R advances or retreats.

First, the left pressing piece 37L and the right pressing piece 37R are returned to the origin positions (positions illustrated in FIG. 4(a)) by the left pressing mechanism 38L and the right pressing mechanism 38R.

When actuating the left pressing mechanism 38L, the piston rod 47R of the right pressing mechanism 38R is retreated in advance. The piston rod 47L of the left pressing mechanism 38L is advanced. A left load cell 48L is provided to the tip of the piston rod 47L. The load cell 48L is an electrical item that converts a load into an electric signal.

When actuating the right pressing mechanism 38R, the left pressing piece 37L and the right pressing piece 37R are set to the origin positions by the left pressing mechanism 38L and the right pressing mechanism 38R and then the piston rod 47L of the left pressing mechanism 38L is retreated in advance. The piston rod 47R of the right pressing mechanism 38R is advanced. A right load cell 48R is provided to the tip of the piston rod 47R. The load cell 48R is an electrical item that converts a load into an electric signal.

The electrical signal of the left load cell 48L and the electrical signal of the right load cell 48R are transmitted to a calculation unit 49. A detection signal of the displacement amount detection mechanism 39 is transmitted to the calculation unit 49.

FIG. 4(b) is a partially enlarged view of a portion b in FIG. 4(a). A compression spring 43L is placed between the load cell 48L and the left pressing piece 37L. Even if the pressing force generated by the left pressing mechanism 38L varies, the variation can be absorbed by the compression spring 43L and the pressing force can be stabilized. From the same reason, a compression spring 43R is placed between the load cell 48R and the right pressing piece 37R.

As illustrated in FIG. 5(a), when the left pressing piece 37L is pressed by the left pressing mechanism 38L, the left pressing piece 37L rotates counterclockwise in FIG. 5(a). The pressing force of the left pressing mechanism 38L is measured by the load cell 48L at all times. The amount of displacement generated by the rotation is measured by the displacement amount detection mechanism 39.

As illustrated in FIG. 5(b), when the amount of displacement is $\delta 1$, the amount of displacement $\delta 1$ is converted into the amount of displacement at a region of the ball 23 by calculating expression of ($\delta 1 \times r/R$).

In the same manner, as shown in FIG. 6(a), when the right pressing piece 37R is pressed by the right pressing mechanism 38R, the right pressing piece 37R rotates clockwise in FIG. 6(a). The pressing force of the right pressing mechanism 38R is measured by the load cell 48R at all times. The amount of displacement generated by the rotation is measured by the displacement amount detection mechanism 39.

As illustrated in FIG. 6(b), when the amount of displacement is $\delta 2$, the amount of displacement $\delta 2$ is converted into the amount of displacement at a region of the ball 23 by calculating expression of ($\delta 2 \times r/R$).

The calculation unit (FIG. 4(a), reference numeral 49) performs calculation of ($\delta 1 \times r/R + \delta 2 \times r/R$)=the amount of backlash. However, the timing to detect the amount of displacement is important. This point will be described below in detail.

Figure 7:
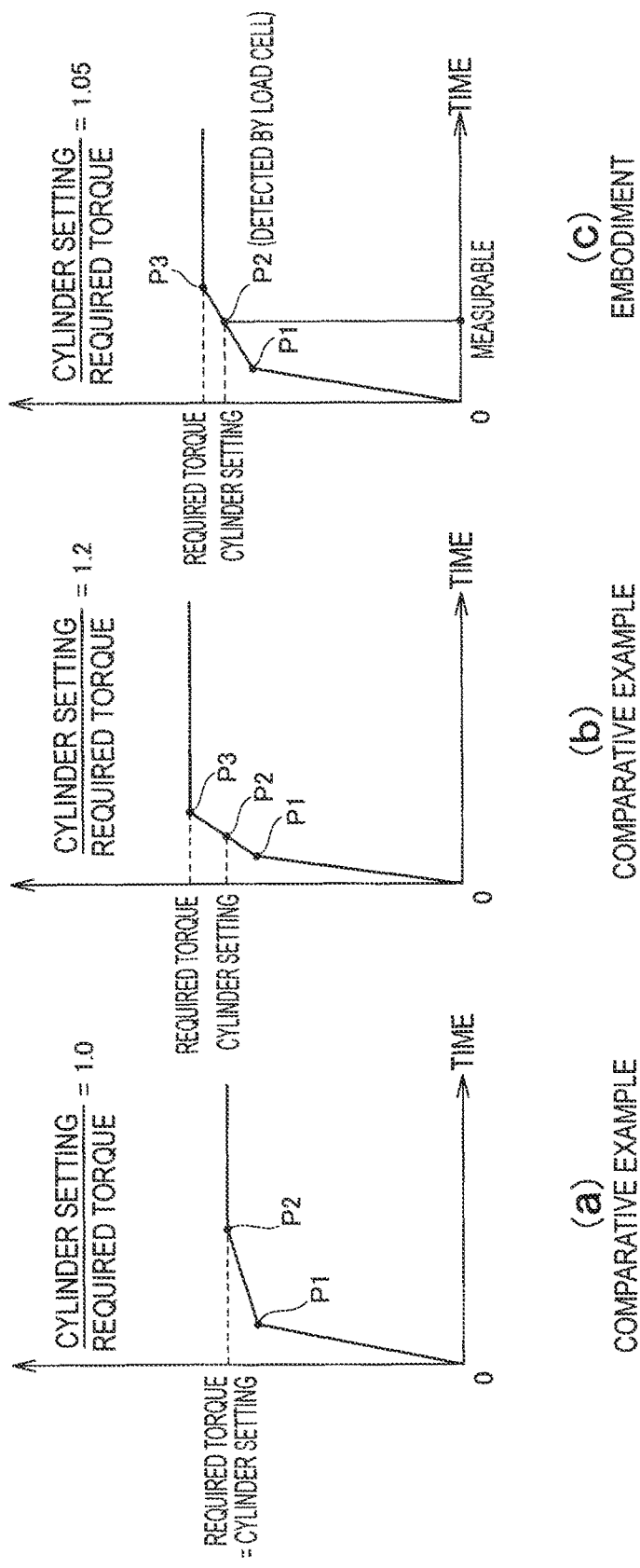
FIGS. 7(a), (b) and (c) are correlation diagrams between a required torque and a cylinder setting.

FIG. 7(a) is a graph illustrating an ideal form. Specifically, the setting of the pressing force of the cylinder unit is set to be equal to a required torque (a torque that is set in advance when measuring the backlash).

A region from the origin 0 to the point P1 is a region where the gap between the ball and the shaft member is being narrowed. The gap becomes 0 at the point P1.

A region from the point P1 to the point P2 is an elastic deformation region of the ball and the shaft member or the sleeve). The reaction force and the pressing force are balanced at the point P2.

Ideally, when the point P2 is reached, the left or the right amount of displacement can be measured. However, in practice, there is a frictional resistance or the like between the inner surface of the cylinder and the piston, so that the point P2 does not reach the required torque. Therefore, the cylinder setting is usually set to be higher.

As illustrated in FIG. 7(b), for example, the cylinder setting is set to 1.2 times the required torque. Then, the torque becomes higher than the point P2, and the reaction force and the pressing force are balanced at the point P3.

Theoretically, when the point P2 is reached, the left or right amount of displacement can be measured. However, the curve from the point P2 to the point P3 rises, so that it is difficult to perform measurement. Therefore, the measurement is performed after the stabilized point P3.

However, if the measurement is performed after the point P3, the left or the right amount of displacement is large, so that an acceptable product may be determined to be a defective product. Therefore, improvement is required.

As illustrated in FIG. 7(c), a load cell is provided in the present invention. The point P2 is detected by the load cell. The calculation can be started from the point P2 based on a detection signal of the load cell.

In addition, the cylinder setting can be set at an intermediate position between (a) and (b) because the load cell is provided. It is guaranteed that the point P2 reaches the required torque by monitoring by the load cell. Therefore, the cylinder setting can be set to 1.05 times the required torque.

When the cylinder setting is set to 1.05 times the required torque, the curve from the point P1 to the point P3 lies (becomes close to the horizontal line). Therefore, the measurement can be performed at the point P2, so that the frequency that an acceptable product is determined to be a defective product decreases drastically.

Further, there is not a large time difference between the point P3 illustrated in FIG. 7(b) and the point P2 illustrated in FIG. 7(c), and the measurement time in FIG. 7(c) is shorter than or equal to that in FIG. 7(b).

Next, an overall operation of the backlash measurement device will be described with reference to FIG. 8.

Figure 8:
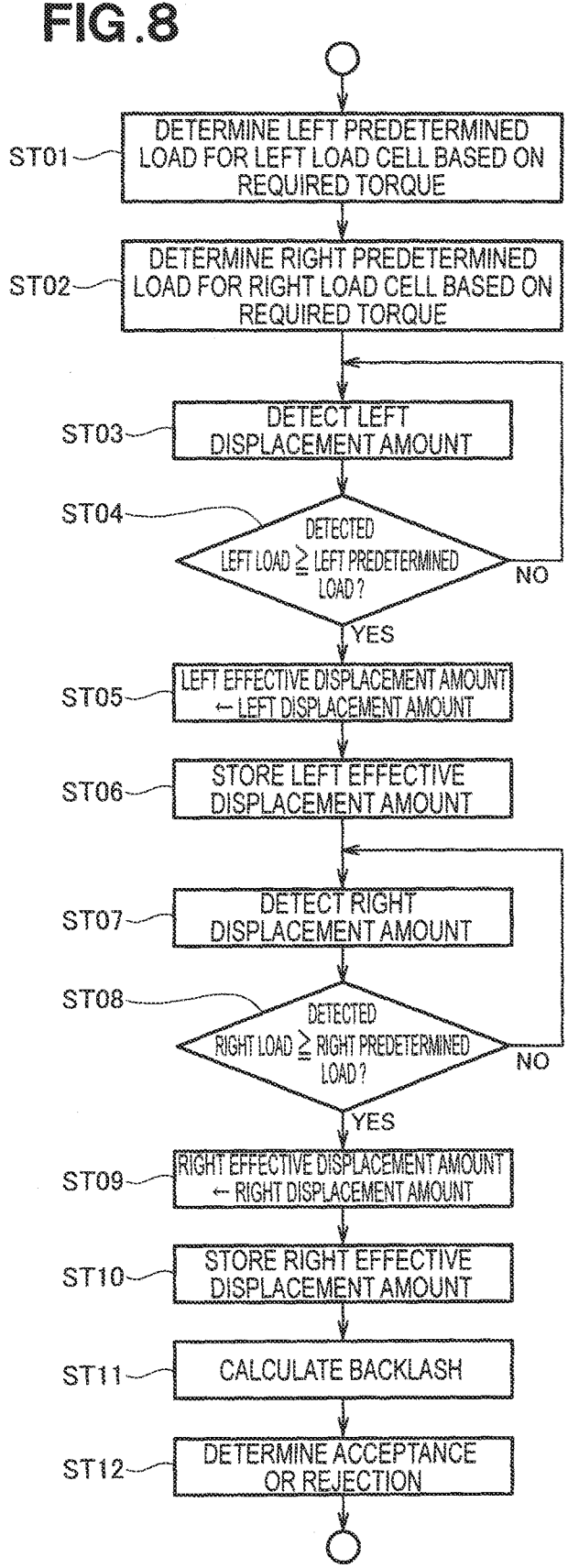
FIG. 8 is a flowchart of a method of the present invention.

In FIG. 8, ST indicates a step number.

The dimension of the required torque is different from that of the load, so that the load (a predetermined load) corresponding to the required torque is determined. Specifically, a left predetermined load for the left load cell is determined and set based on the required torque (ST01). In the same manner, a right predetermined load for the right load cell is determined and set (ST02). A load cell load determination step is performed in ST01 and ST02.

Subsequently, a left displacement amount is detected by the displacement amount detection mechanism (ST03, left displacement amount detection step).

Then, it is checked whether or not the load detected by the left load cell reaches the left predetermined load (ST04). When the load reaches the left predetermined load, the left displacement amount is determined as a left effective displacement amount (ST05). Then, the calculation unit is caused to store the left effective displacement amount (ST06, left effective displacement amount storage step).

In the same manner, a right displacement amount is detected by the displacement amount detection mechanism (ST07, right displacement amount detection step).

Then, it is checked whether or not the load detected by the right load cell reaches the right predetermined load (ST08). When the load reaches the right predetermined load, the right displacement amount is determined as a right effective displacement amount (ST09). Then, the calculation unit is caused to store the right effective displacement amount (ST10, right effective displacement amount storage step).

The calculation unit is caused to calculate the backlash based on the left effective displacement amount and the right effective displacement amount (ST11, calculation step). Finally, the calculation unit is caused to determine acceptance or rejection (ST12). The display of the acceptance or rejection may be performed by any of a display, a recording paper, a lamp, and a buzzer, or a combination of these.

Next, structures of elements included in the backlash device 30 will be described in detail.

As illustrated in FIG. 3, the part support mechanism 35 includes shaft member gripping mechanisms 51 and 51 that grip the shaft member 11, a cup member 52 which supports the shaft member gripping mechanisms 51 and 51 and surrounds the lower end of the shaft member 11, and a holding mechanism 53 which is placed between the cup member 52 and the device frame 32 and which rotatably holds the cup member 52.

An example is illustrated in which the device frame 32 has a simple shape. However, a plurality of device frames or a frame having a complicated shape may be used.

An oil hydraulic cylinder having a large gripping force is preferred as a sleeve gripping mechanism 33 and the shaft member gripping mechanism 51.

A bearing is preferred as the holding mechanism 53.

An electric cylinder unit, an oil hydraulic cylinder unit, and an air cylinder unit can be applied to the left pressing mechanism 38L and the right pressing mechanism 38R. Although the air cylinder unit is inexpensive, the positional accuracy is not good. On the other hand, the oil hydraulic cylinder unit has good positional accuracy. However, the oil hydraulic cylinder unit needs an oil pressure generating device and hydraulic piping and is expensive.

The electric cylinder unit needs only wiring and is more inexpensive than the oil hydraulic cylinder unit. Further, the electric cylinder unit has good positional accuracy because a screw shaft is used.

Therefore, the electric cylinder unit is recommended from a viewpoint of cost and positional accuracy.

The displacement amount detection mechanism 39 may be any type of mechanism, such as an electronic micrometer, which converts a moving distance into an electrical signal.

A modified example according to the present invention will be described with reference to FIGS. 9 to 16.

Figure 9:
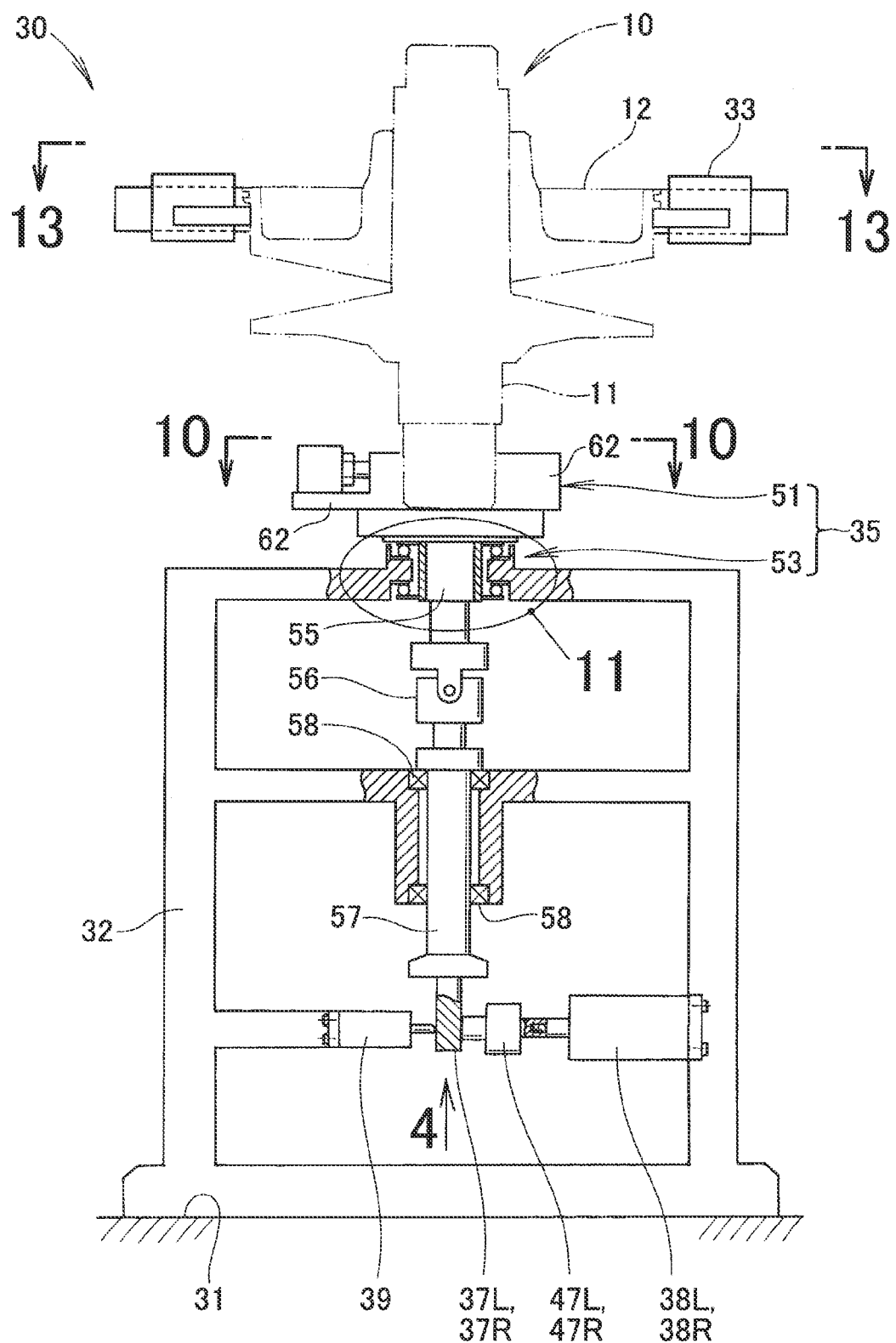
FIG. 9 is a diagram illustrating a modified example of the backlash measurement device according to the present invention.

As illustrated in FIG. 9, a backlash device 30 includes a device frame 32 that is fixed to a base 31, a part fixing mechanism 33 which is attached to the device frame 32 and fixes the sleeve 12 as a first part, a part support mechanism 35 which is rotatably attached to the device frame 32 and supports the shaft member 11 as a second part, a left pressing piece 37L which is attached to the part support mechanism 35 and extends the same distance from the rotation center so as to pass through the rotation center, a left pressing mechanism 38L which is provided to the device frame 32 and presses the left pressing piece 37L, a right pressing piece 37R which is attached to the part support mechanism 35 and extends the same distance from the rotation center so as to pass through the rotation center, a right pressing mechanism 38R which is provided to the device frame 32 and presses the right pressing piece 37R, a displacement amount detection mechanism 39 which is provided to the device frame 32 and detects an amount of displacement of the left pressing piece 37L and an amount of displacement of the right pressing piece 37R, and a calculation unit (FIG. 4(*a*), reference numeral 49) that obtains the backlash based on the left displacement amount and the right displacement amount detected by the displacement amount detection mechanism 39.

In this example, the part support mechanism 35 includes a shaft member gripping mechanism 51 that grips the shaft member 11 and a holding mechanism 53 that causes the device frame 32 to rotatably hold the shaft member gripping mechanism 51.

The shaft member gripping mechanism 51 has a shaft portion 55 extending downward. The shaft portion 55 is connected to a lower connecting shaft 57 by a universal shaft coupling 56. The connecting shaft 57 is rotatably supported by the device frame 32 through bearings 58 and 58. The left pressing piece 37L and the right pressing piece 37R are fixed to the lower end of the connecting shaft 57.

Figure 10:
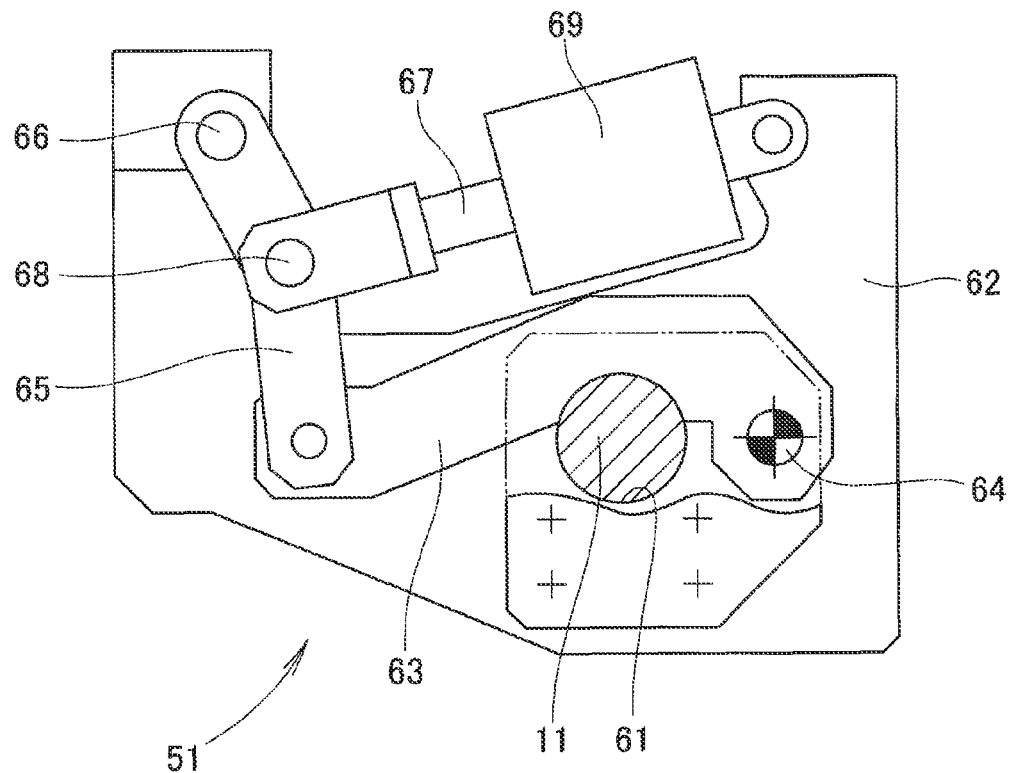
FIG. 10 is a view as seen in the direction of arrows 10-10 of FIG. 9.

As illustrated in FIG. 10, the shaft member gripping mechanism 51 includes a rotating plate 62 which has a hole 61, through which the shaft member 11 passes, and rotates along with the shaft member 11, a lock arm 63 extended so as to be in contact with the hole 61, a support pin 64 that pins the tip of the lock arm 63 to the rotating plate 62, a bent link 65 extended from the base portion of the lock arm 63, a lock pin 66 that pins the tip of the bent link 65 to the rotating plate 62, and a lock cylinder 69 in which a piston rod 67 extends nearly along the lock arm 63 and is pinned to the rotating plate 62 and the tip of the piston rod 67 is connected to a bent point 68 of the bent link 65.

When the lock cylinder 69 is extended, the shape of the bent link 65 changes from a V shape to an I shape. By this change, the lock arm 63 rotates counterclockwise in FIG. 10 around the support pin 64. The rock arm 63 rotates so that a part of the lock arm 63 overlaps with the hole 61.

When the lock cylinder 69 is shortened, the shape of the bent link 65 changes from an I shape to a V shape. By this change, the lock arm 63 rotates clockwise in FIG. 10 around the support pin 64. The rock arm 63 rotates so that the lock arm 63 moves away from the hole 61.

When the lock cylinder 69 is extended in a state in which the shaft member 11 is inserted into the hole 61, it is possible to restrict the shaft member 11 by the lock arm 63. In a state in which the shaft member 11 is restricted, the shaft member 11 and the rotating plate 62 rotate in synchronization with each other.

The shaft member gripping mechanism 51 has one lock arm 63 as a main element, so that the structure is simple and the number of components is small. Therefore, the shaft member gripping mechanism 51 is inexpensive. On the other hand, the shaft member gripping mechanism 51 has a problem described below.

The diameter of the hole 61 is set to be somewhat greater than the outer diameter of the shaft member 11. This is because if there is no gap, the shaft member 11 cannot be inserted into the hole 61. The shaft member 11 is presses by the lock arm 63 in a direction perpendicular to the shaft, so that the shaft member 11 is biased with respect to the hole 61. As a result, a shift occurs between the center of the hole 61 and the center of the shaft member 11.

The holding mechanism 53 is improved to deal with the shift.

Figure 11:
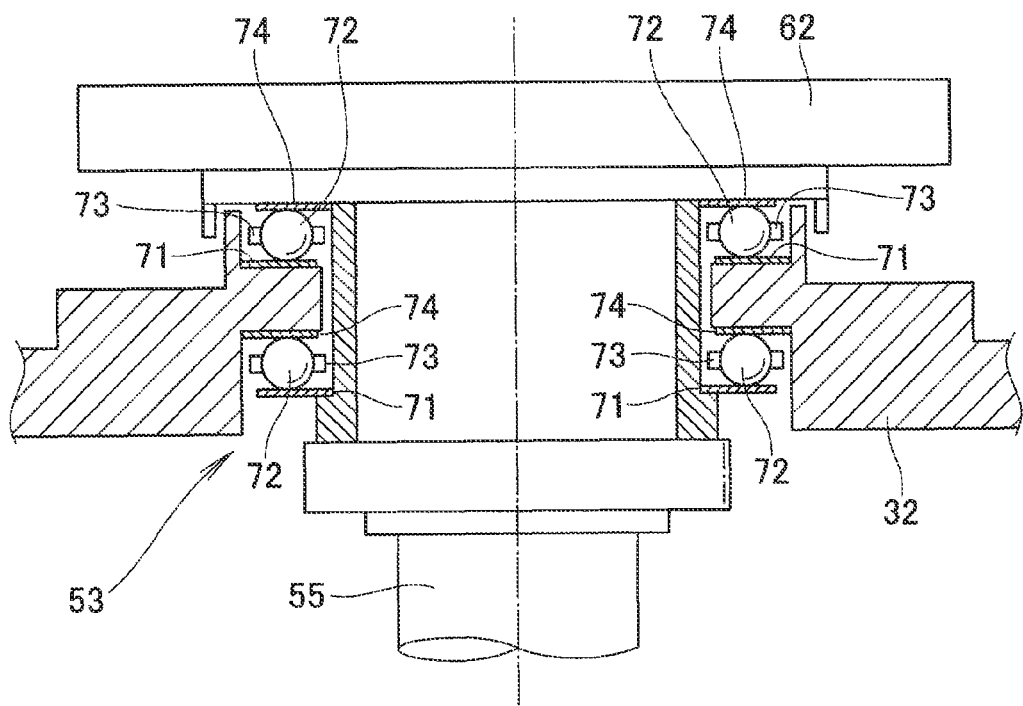
FIG. 11 is an enlarged view of portion 11 of FIG. 9.

As illustrated in FIG. 11, the holding mechanism 53 includes a lower doughnut plate 71 having a flat upper surface, a plurality of balls 72 mounted on the upper surface of the lower doughnut plate 71, a retainer 73 that retains the balls 72 to keep the pitches and the trajectories of the balls 72, and an upper doughnut plate 74 which is mounted on the balls 72 and which has a flat lower surface.

The upper doughnut plate 74 can move with respect to the lower doughnut plate 71 in a direction perpendicular to the shaft, so that the shaft portion 55 moves in the direction perpendicular to the shaft. As a result, the movement of the shaft member 11 in the direction perpendicular to the shaft is allowed.

In FIG. 9, the connecting shaft 57 is attached to the device frame 32 through the bearings 58 and 58, so that the connecting shaft 57 can rotate but cannot move in the direction perpendicular to the shaft. Therefore, the universal shaft coupling 56 is placed between the shaft portion 55 and the connecting shaft 57.

Figure 12:
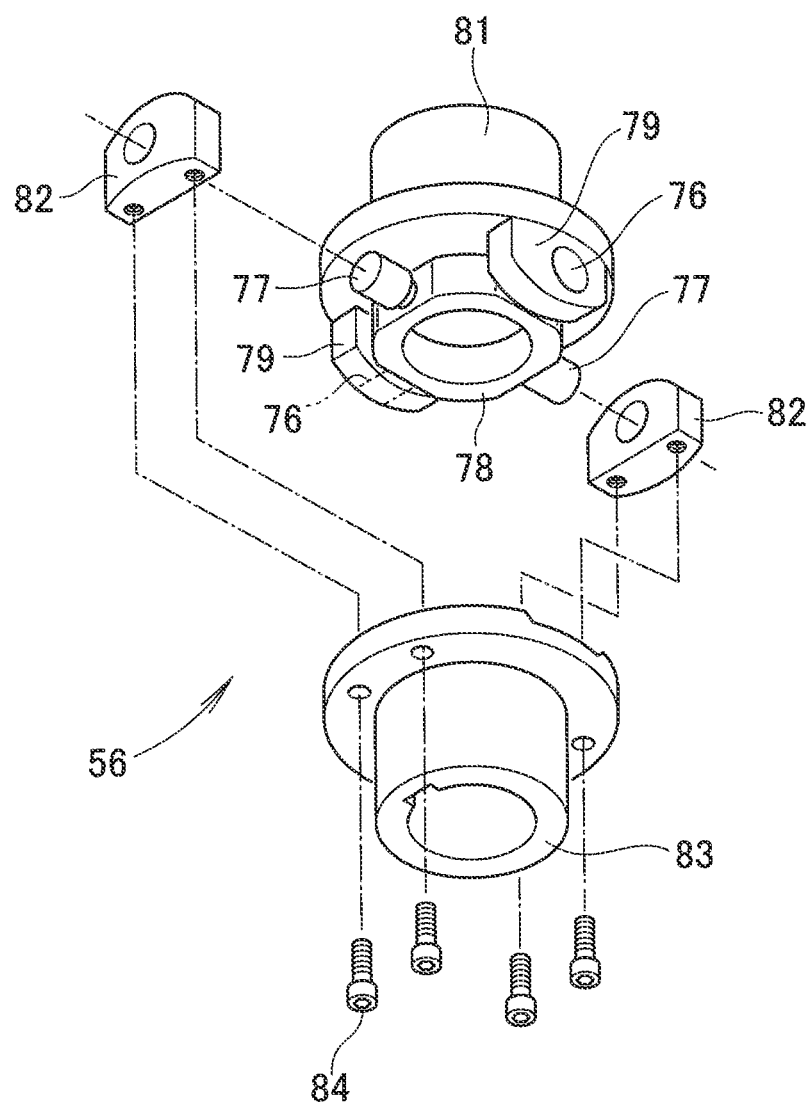
FIG. 12 is an exploded perspective view of a universal shaft coupling.

As illustrated in FIG. 12, the universal shaft coupling 56 includes a cross-shaped member 78 including x shaft pins 76 and 76 and y shaft pins 77 and 77 perpendicular to the x shaft pins 76 and 76, one hub 81 including one eye plates 79 and 79 that fit to the x shaft pins 76 and 76, and the other hub 83 which is provided opposite to the one hub 81 and which includes the other eye plates 82 and 82 that fit to the y shaft pins 77 and 77. The other eye plates 82 and 82 are fixed to the other hub 83 by bolts 84.

The one eye plate 79 can move along the x shaft pin 76 and the other eye plate 82 can move along the y shaft pin 77. Therefore, the one hub 81 can relatively move with respect to the other hub 83 in the direction perpendicular to the shaft. Even while moving, the rotational force is transmitted from the other hub 83 to the one hub 81.

Figure 13:
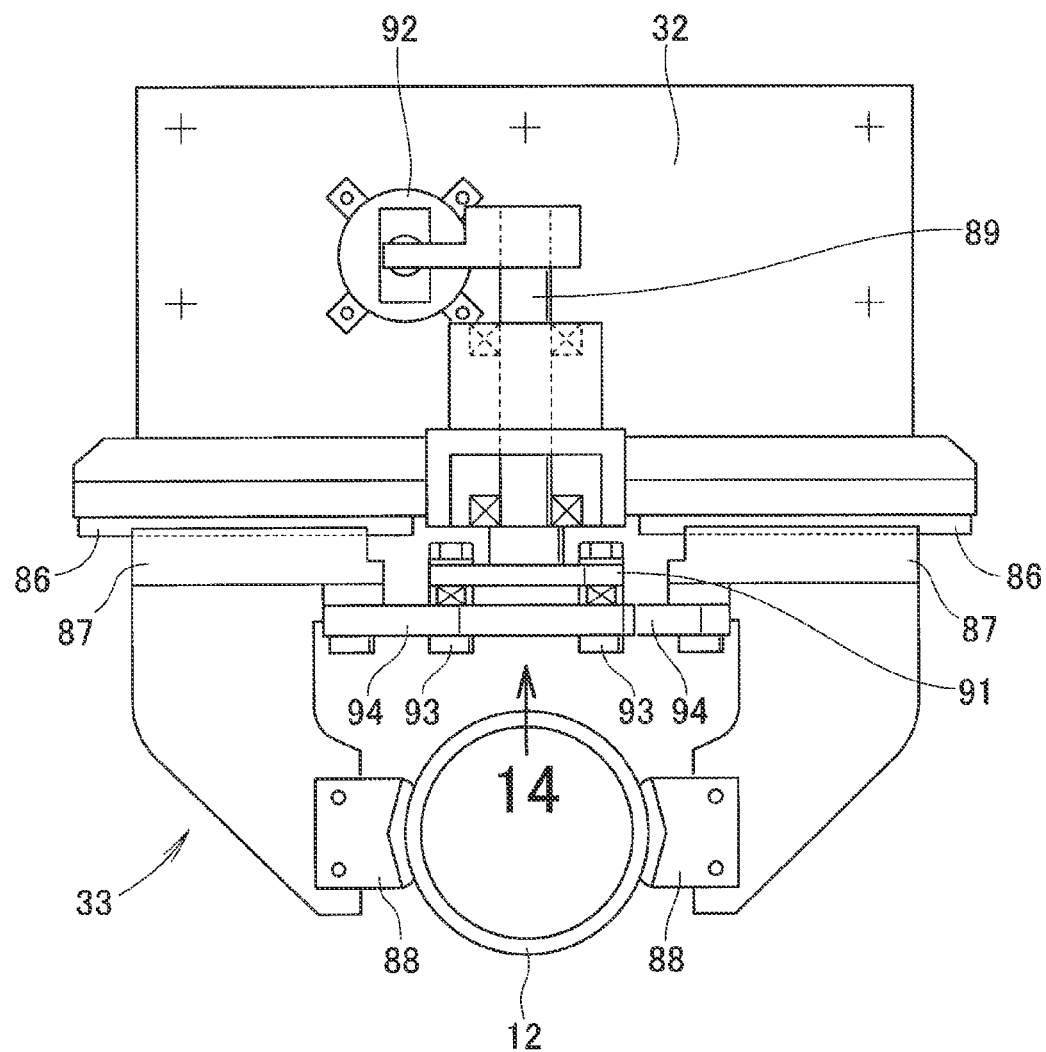
FIG. 13 is a view as seen in the direction of arrows 13-13 of FIG. 9.

As illustrated in FIG. 13, the part fixing mechanism 33 includes horizontal rails 86 and 86 horizontally laid on the device frame 32, sliders 87 and 87 movably attached to the horizontal rails 86 and 86, V blocks 88 and 88 which are attached to the tips of the sliders 87 and 87 and which come into contact with the sleeve 12, a rotating shaft 89 which is rotatably supported by the device frame 32 and which extends toward the sleeve 12, a driving plate 91 attached to the tip of the rotating shaft 89, and an expansion/contraction cylinder 92 which is attached to the device frame 32 and which rotates the rotating shaft 89.

Figure 14:
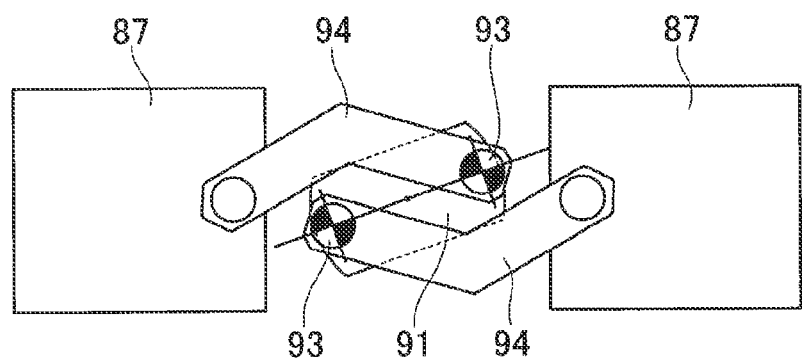
FIG. 14 is a view as seen in the direction of arrow 14 of FIG. 13.

Further, as illustrated in FIG. 14, the driving plate 91 has an I shape. One ends of V-shaped links 94 and 94 are connected to both ends of the driving plate 91 by pins 93 and 93. The other ends of the V-shaped links 94 and 94 are connected to the sliders 87 and 87.

Figure 16:
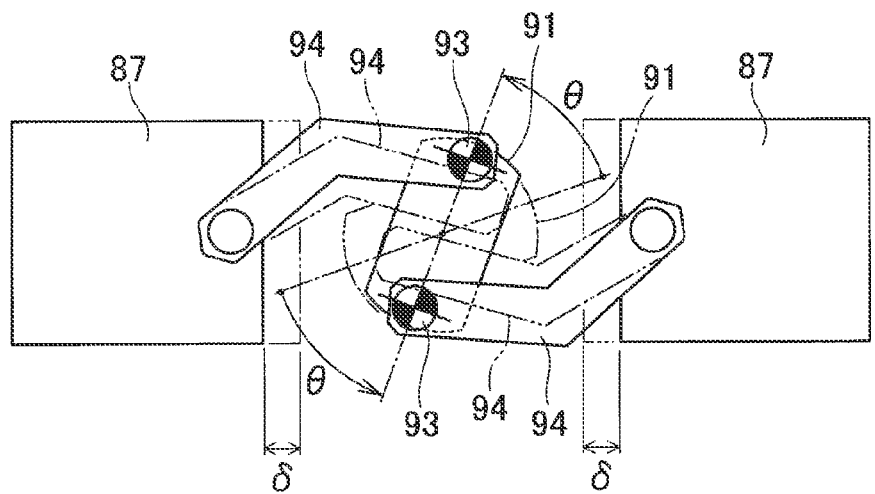
FIG. 16 is a view as seen in the direction of arrow 16 of FIG. 15.

As illustrated in FIG. 16, when the driving plate 91 is rotated by an angle θ, the V-shaped links 94 and 94 illustrated by imaginary lines move to positions illustrated by solid lines. The slider 87 is moved by δ by this movement.

Figure 15:
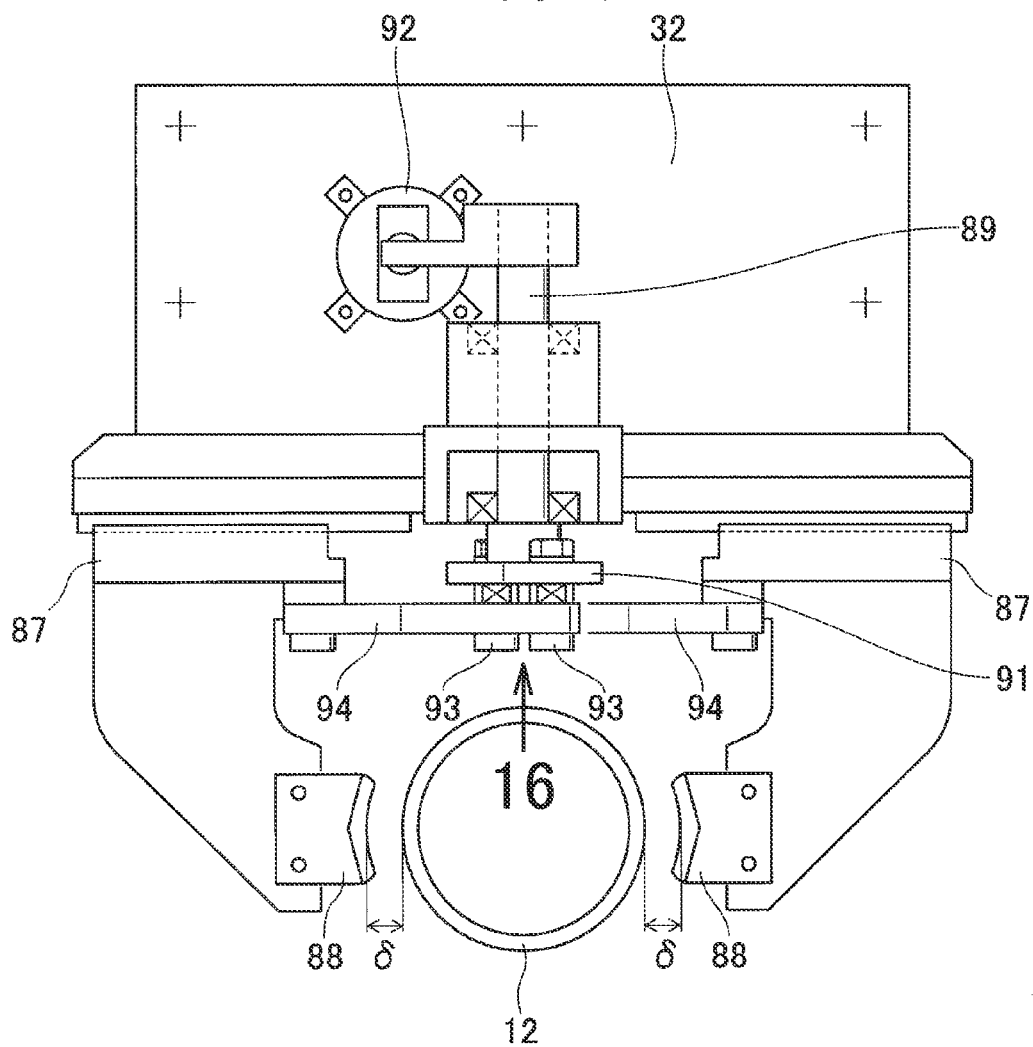
FIG. 15 is a view illustrating a operation of a fixing mechanism.

As a result, as illustrated in FIG. 15, the V blocks 88 and 88 move away from the sleeve 12. In FIG. 15, when the rotating shaft 89 is reversely rotated by the expansion/contraction cylinder 92, the gap δ becomes close to zero and the state of FIG. 13 is generated. In FIG. 13, the sleeve 12 is fixed by the V blocks 88 and 88.

A further modified example according to the present invention will be described with reference to FIG. 17.

Figure 17:
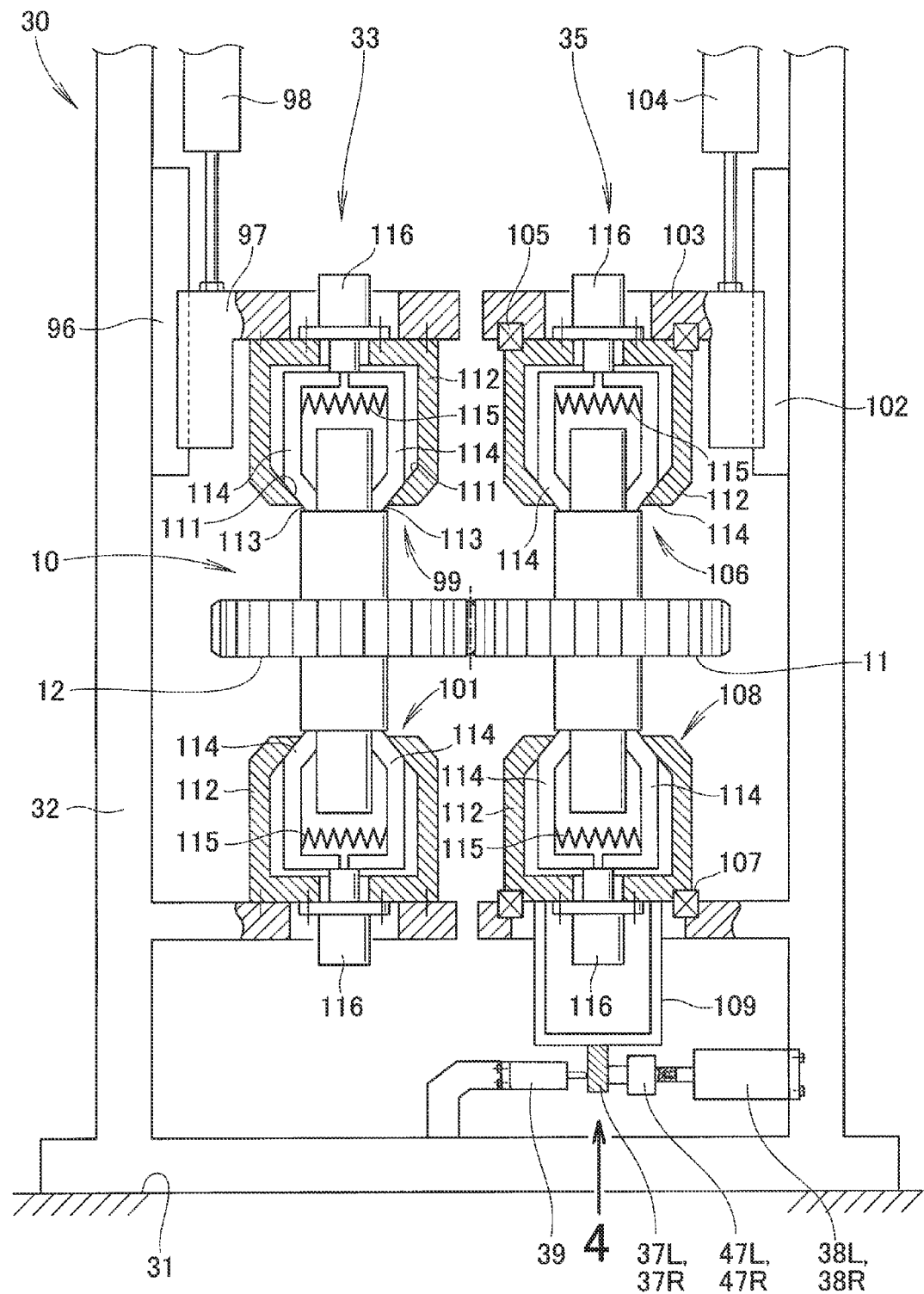
FIG. 17 is a diagram illustrating a further modified example of the backlash measurement device according to the present invention.
Figure 18:
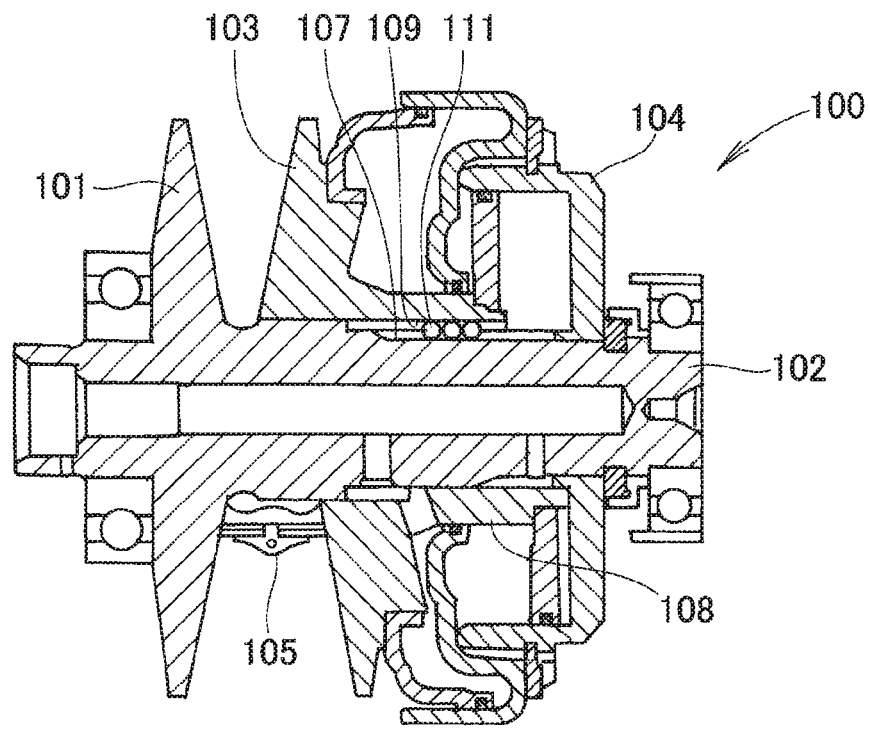
FIG. 18 is a cross-sectional view of a conventional belt-type continuously variable transmission.
Figure 19:
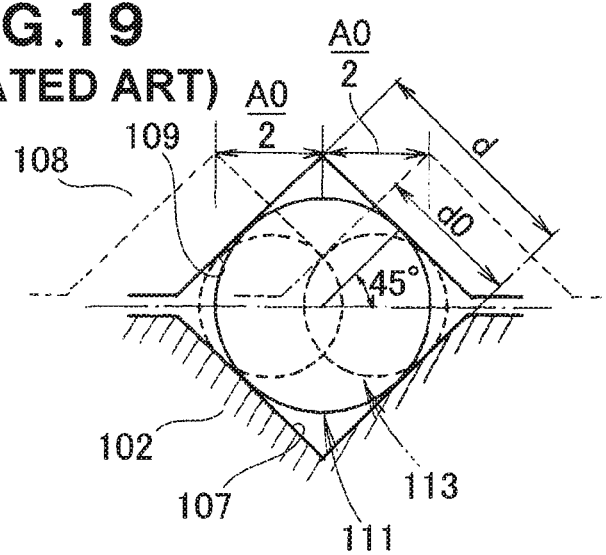
FIG. 19 is a diagram for explaining a basic principle of a conventional backlash measurement.

As illustrated in FIG. 17, a backlash device 30 includes a device frame 32 that is fixed to a base 31, a part fixing mechanism 33 which is attached to the device frame 32 and fixes a first gear 12 as a first part, a part support mechanism 35 which is rotatably attached to the device frame 32 and supports a second gear 11 as a second part, a left pressing piece 37L which is attached to the part support mechanism 35 and extends the same distance from the rotation center so as to pass through the rotation center, a left pressing mechanism 38L which is provided to the device frame 32 and presses the left pressing piece 37L, a right pressing piece 37R which is attached to the part support mechanism 35 and extends the same distance from the rotation center so as to pass through the rotation center, a right pressing mechanism 38R which is provided to the device frame 32 and presses the right pressing piece 37R, a displacement amount detection mechanism 39 which is provided to the device frame 32 and detects an amount of displacement of the left pressing piece 37L and an amount of displacement of the right pressing piece 37R, and a calculation unit (FIG. 4(a), reference numeral 49) that obtains the backlash based on the left displacement amount and the right displacement amount detected by the displacement amount detection mechanism 39.

The part fixing mechanism 33 includes a first rail 96 that is attached to the device frame 32 in the vertical direction, a first slider 97 that moves along the first rail 96, a first raising and lowering cylinder 98 that raises and lowers the first slider 97, a first chuck mechanism 99 which is attached to the first slider 97 and grips the upper end of the first gear 12, and a second chuck mechanism 101 which is fixed to the device frame 32 and grips the lower end of the first gear 12.

The part support mechanism 35 includes a second rail 102 that is attached to the device frame 32 in the vertical direction so that the second rail 102 is in parallel with the first rail 96, a second slider 103 that moves along the second rail 102, a second raising and lowering cylinder 104 that raises and lowers the second slider 103, a third chuck mechanism 106 which is rotatably attached to the second slider 103 through a bearing 105 and which grips the upper end of the second gear 11, a fourth chuck mechanism 108 which is rotatably attached to the device frame 32 through a bearing 107 and which and grips the lower end of the second gear 11, and a cup 109 that extends downward from the fourth chuck mechanism 108. The left pressing piece 37L and the right pressing piece 37R are attached to the cup 109.

The first chuck mechanism 99 includes a housing 112 including tapered surfaces 111 and 111 having a V shape, clamp claws 114 and 114 which are housed in the housing 112 and which have sloped surfaces 113 and 113 in contact with the tapered surfaces 111 and 111 and are divided, a compression spring 115 that urges the clamp claws 114 and 114 to an opening side, and a clamp cylinder 116 that moves the clamp claws 114 and 114 in the shaft direction.

When the clamp cylinder 116 is extended, the sloped surface 113 advances along the tapered surface 111, so that the clamp claws 114 and 114 come close to each other. As a result, the clamp claws 114 and 114 can grip the upper end of the first gear 12.

The second to the fourth chuck mechanisms 101, 106 and 108 have the same structure as that of the first chuck mechanism 99, so that reference numerals are reused and the detailed description is omitted.

The first gear 12 is fixed not to rotate and the second gear 11 is rotatably supported, so that it is possible to measure a backlash present between the first gear 12 and the second gear 11.

The present invention is preferable to measure a backlash of a belt-type continuously variable transmission. However, any type of workpiece can be used if the workpiece includes a shaft member having an inner spline groove, a sleeve having an outer spline groove, and a ball or a needle placed between the two grooves.

Further, in the embodiment, the shaft member is vertically arranged with respect to the ground. However, the shaft member may be arranged horizontally or obliquely.

Further, the cup member is a name for convenience. Therefore, the cup member may be a fork member and the shape of the member may be changed if the member has the same function.

INDUSTRIAL APPLICABILITY

The present invention is preferable to measure a backlash of a belt-type continuously variable transmission.

REFERENCE SIGNS LIST

10 Workpiece, 11 Second part (Shaft member, Second gear), 12 First part (Sleeve, First gear), 20 Ball spline mechanism, 21 Inner spline groove, 22 Outer spline groove, 23 Ball, 30 Backlash measurement device, 31 Base, 32 Device frame, 33 Part fixing mechanism, 35 Part support mechanism, 37L, 37R Pressing piece, 38L, 38R Pressing mechanism, 39 Displacement amount detection mechanism, 41 Rotation center (Shaft center), 47L, 47R Piston rod, 48L, 48R Load cell, 49 Calculation unit, 51 Shaft member gripping mechanism, 52 Cup member, 53 Holding mechanism, 61 Hole, 62 Rotating plate, 63 Lock arm, 64 Support pin, 65 Bent link, 66 Lock pin, 67 Piston rod, 68 Bent point, 69 Lock cylinder, 71 Lower doughnut plate, 72 Ball, 73 Retainer, 74 Upper doughnut plate.

The invention claimed is:

1. A backlash measurement device for measuring a backlash present between a first part included in a workpiece and a second part engaging with the first part, the backlash measurement device comprising:
   a device frame fixed to a base;
   a part fixing mechanism attached to the device frame for fixing the first part;
   a part support mechanism rotatably attached to the device frame for supporting the second part;
   left and right pressing pieces attached to the part support mechanism and extending a same distance from a rotation center so as to pass through the rotation center;
   a left pressing mechanism for pressing the left pressing piece and a right pressing mechanism for pressing the right pressing piece;
   a displacement amount detection mechanism which comes into contact with the right pressing piece and measures an amount of displacement of the left pressing piece and an amount of displacement of the right pressing piece; and
   a calculation unit for obtaining the backlash on the basis of the left displacement amount and the right displacement amount which are detected by the displacement amount detection mechanism.

2. The backlash measurement device according to claim 1, wherein the second part is a shaft member including an inner spline groove, the first part is a sleeve including an outer spline corresponding to the inner spline groove and a ball that fits to the outer spline, and the ball is placed between the outer spline groove and the inner spline groove and a backlash caused by the ball is measured.

3. The backlash measurement device according to claim 2, wherein the part support mechanism includes a shaft member gripping mechanism that grips the shaft member, a cup member which supports the shaft member gripping mechanism and surrounds a shaft end of the shaft member, and a holding mechanism which is placed between the cup member and the device frame and which rotatably holds the cup member.

4. The backlash measurement device according to claim 2, wherein the part support mechanism includes a shaft member gripping mechanism that grips the shaft member and a holding mechanism which is placed between the shaft member gripping mechanism and the device frame and which rotatably holds the shaft member gripping mechanism, and the shaft member gripping mechanism includes a rotating plate which has a hole, through which the shaft member passes, and rotates along with the shaft member, a lock arm that is extended so as to be in contact with the hole, a support pin that pins a tip of the lock arm to the rotating plate, a bent link that is extended from a base portion of the lock arm, a lock pin that pins a tip of the bent link to the rotating plate, and a lock cylinder in which a piston rod extends along the lock arm and is pinned to the rotating plate and a tip of the piston rod is connected to a bent point of the bent link.

5. The backlash measurement device according to claim 2, wherein the shaft member is vertically arranged.

6. The backlash measurement device according to claim 4, wherein the holding mechanism includes a lower doughnut plate having a flat upper surface, a plurality of balls mounted on the upper surface of the lower doughnut plate, a retainer that retains the balls to keep pitches and trajectories of the balls, and an upper doughnut plate which is mounted on the balls and which has a flat lower surface.

7. The backlash measurement device according to claim 2, wherein the shaft member is a fixed sheave of a belt-type continuously variable transmission and the sleeve is a movable sheave of the belt-type continuously variable transmission.

8. The backlash measurement device according to claim 1, wherein the first part is a first gear, and the second part is a second gear engaging with the first gear.

9. The backlash measurement device according to claim 1, wherein each of the left pressing mechanism and the right pressing mechanism includes a cylinder unit and a load cell attached to a tip of a piston rod of the cylinder unit.

10. The backlash measurement device according to claim 9, wherein the cylinder unit is an electric cylinder unit.

11. A backlash measurement method for measuring a backlash present between a first part included in a workpiece and a second part engaging with the first part by using a backlash measurement device,
   wherein the backlash measurement device comprises:
   a part fixing mechanism attached to a device frame fixed to a base for fixing the first part;
   a part support mechanism rotatably attached to the device frame for supporting the second part;
   left and right pressing pieces attached to the part support mechanism and extending a same distance from a rotation center so as to pass through the rotation center;
   a left pressing mechanism for pressing the left pressing piece and a right pressing mechanism for pressing the right pressing piece; wherein each of the left pressing mechanism and the right pressing mechanism includes a cylinder unit and a load cell attached to a tip of a piston rod of the cylinder unit; and
   a displacement amount detection mechanism which comes into contact with the right pressing piece and measures an amount of displacement of the left pressing piece and an amount of displacement of the right pressing piece,
   the backlash measurement method comprising the steps of:

converting a torque value required for the workpiece into a load of the load cell prior to a measurement and determining a left predetermined load and a right predetermined load;

detecting a left displacement amount by the displacement amount detection mechanism;

causing a calculation unit to store the left displacement amount as a left effective displacement amount after a load detected by the left load cell reaches the left predetermined load;

detecting a right displacement amount by the displacement amount detection mechanism;

causing the calculation unit to store the right displacement amount as a right effective displacement amount after a load detected by the right load cell reaches the right predetermined load; and causing the calculation unit to calculate a backlash based on the left effective displacement amount and the right effective displacement amount.

* * * * *